United States Patent [19]

Maurer et al.

[11] 4,346,207

[45] Aug. 24, 1982

[54] FLOWABLE, CURABLE EPOXY RESIN MIXTURE

[75] Inventors: Jürg Maurer, Riehen; Heinz Rembold, Arlesheim, both of Switzerland

[73] Assignee: Ciba-Geigy Corporation, Ardsley, N.Y.

[21] Appl. No.: 288,856

[22] Filed: Jul. 31, 1981

[30] Foreign Application Priority Data

Aug. 11, 1980 [CH] Switzerland .................. 6059/80

[51] Int. Cl.$^3$ ..................... C08G 59/26; C08G 59/42
[52] U.S. Cl. ..................................... 528/103; 528/93; 528/95; 528/112; 528/367
[58] Field of Search ................. 528/93, 95, 103, 112, 528/367

[56] References Cited

U.S. PATENT DOCUMENTS

| | | | |
|---|---|---|---|
| 3,449,353 | 6/1969 | Porret et al. | 548/309 |
| 3,821,243 | 6/1974 | Habermaier et al. | 294/69 R |
| 3,975,397 | 8/1976 | Habermeier et al. | 528/367 X |
| 4,246,161 | 1/1981 | Smith et al. | 528/103 X |

*Primary Examiner*—Earl A. Nielsen
*Attorney, Agent, or Firm*—Luther A. R. Hall

[57] ABSTRACT

Flowable, curable mixtures based on bisphenol epoxy resins cured with anhydrides, and which are modified with di- or triglycidyl-hydantoin compounds, give cured mouldings with improved dimensional stability under heat while having at least unchanged flexibility.

5 Claims, No Drawings

FLOWABLE, CURABLE EPOXY RESIN MIXTURE

The present invention relates to a flowable epoxy resin mixture which contains an anhydride hardener and a mixture of epoxy resins based on bisphenols and hydantoins.

Insulating materials based on bisphenol epoxy resins cured with acid anhydrides have found wide application in the electrical industry. For special applications, e.g. in SF$_6$ plant construction, there is an increasing demand for epoxy resins with good dimensional stability under heat and good mechanical properties.

It is proving difficult, however, to achieve this improvement in properties by modification of the bisphenol epoxy resins and it has nor been possible up to now to change the property spectrum in this manner with only one modifier. A greater dimensional stability under heat is generally achieved by means of a higher crosslinking density in the cured epoxy resin. But it is known that, in doing so, mechanical properties such as flexibility, deflection, elongation at break or impact strength, decrease simultaneously.

Hydantoin based epoxy resins are described in German Offenlegungschrift Nos. 1 670 439 and 2 217 914, and mention is also made that these compounds, in combination with other epoxides, can be used for curable mixtures. While good dimensional stability under heat can be obtained with these epoxy resins, the mechanical stability of the cured mixtures is too low for many utilities.

The present invention has for its object to modify moulding materials made from epoxy resins based on bisphenols and acid anhydride hardeners, such that the dimensional stability under heat is increased and the mechanical properties are at least retained or improved.

Accordingly, the present invention provides a flowable, curable mixture based on bisphenol epoxy resins containing on average more than one epoxy group in the molecule, a hardener for epoxy resins and, if desired, other ingredients, said mixture comprising:
(a) an anhydride hardener, and
(b) a mixture of 90 to 50% by weight of at least one bisphenol epoxy resin and 10 to 50% by weight of at least one hydantoin epoxy resin of the formula I or II

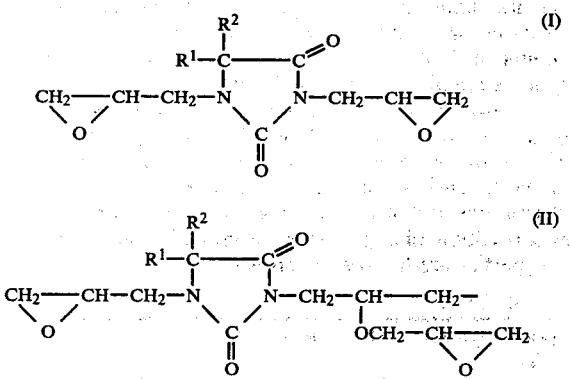

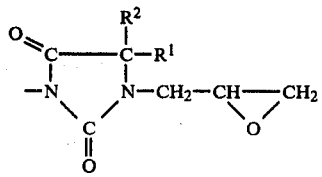

wherein R$^1$ and R$^2$ are methyl or ethyl.

The mixture preferably contains 90 to 60% by weight, most preferably 80 to 60% by weight, of a bisphenol epoxy resin, and 10 to 40% by weight, most preferably 20 to 40% by weight, of a hydantoin epoxy resin. In addition, the mixture preferably contains the epoxy compound of the formula II.

The acid anhydride hardeners are known and are derived from polyfunctional carboxylic acids. They are generally employed in amounts of 50 to 200 parts by weight, based on 100 parts by weight of the epoxy resins. Examples are: phthalic anhydride, Δ$^4$-tetrahydrophthalic anhydride, hexahydropthalic anhydride, 4-methylhexahydrophthalic anhydride, 3,6-endomethylene-Δ$^4$-tetrahydrophthalic anhydride, 4-methyl-3,6-endomethylene-Δ$^4$-tetrahydrophthalic anhydride, (=methylnadicanhydride), 3,4,5,6,7,7-hexachloro-3,6-endomethylene-Δ$^4$-tetrahydrophthalic anhydride, succinic anhydride, adipic anhydride, trimethyladipic anhydride, azelaic anhydride, sebacic anhydride maleic anhydride, dodecenylsuccinic anhydride, pyromellitic dianhydride, or mixtures of such anhydrides.

The di- and triglycidyl compounds of the formulae I and II are known and described in German Offenlegungsschriften Nos. 1 670 439 and 2 217 914.

The bisphenol based epoxy resins are also known compounds. They are obtained by glycidylation of the hydroxyl groups of bisphenols. The bisphenols can be compounds of the general formula

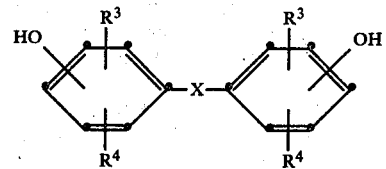

wherein each of R$_3$ and R$_4$ is a hydrogen atom, a halogen atom, especially chlorine or bromine, and alkyl of 1 to 4 carbon atoms, and X is a direct bond, C$_1$–C$_4$-alkylene, C$_2$–C$_{12}$-alkylidene, C$_5$–C$_7$-cycloalkylidene, O, S, $$\overset{OCO}{\underset{O}{\|}}$$

SO, SO$_2$. X is preferably methylene, ethylidene, 2,2-propylidene, a direct bond, O or S. The hydroxyl groups are preferably in the 4-position and the substituents R$^3$ and R$^4$ are bonded in the 3- and 5-positions. The most preferred compounds are the technically important epoxy resins which are derived from 2,2-bis-(4-hydroxyphenyl)propane (bisphenol A).

The curing of the mixtures of the invention to moulded articles and the like is conveniently carried out in the temperature range from 20° to 200° C. The curing can also be carried out, in known manner, in two or more steps, the precuring being carried out at low temperature and the post-curing at more elevated temperature.

It is also possible to use a hardening accelerator when curing the mixture of the invention, e.g. 0.1 to 5% by weight, based on the epoxy resins. Examples of such accelerators are: tertiary amines, salts thereof or quaternary ammonium compounds, e.g. 2,4,6-tris(dimethylaminomethyl)phenol, benzyldimethylamine, 2-ethyl-4-methylimidazole, triamylammonium phenolate; or alkali metal alcoholates, e.g. sodium hexane triolate, mono- or polyphenols such as phenol or diomethane, salicyclic acid, or salts of thiocyanic acid such as $NH_4SCN$.

Before the final curing, conventional modifiers can be added to the curable mixtures of the invention in any phase. Examples of such modifiers are extenders, fillers and reinforcing agents, pigments, dyes, organic solvents, plasticisers, flow control agents, thixotropic agents, flame retardants and mould release agents.

Examples of extenders, reinforcing agents, fillers and pigments which can be added to the mixtures are: coal tar, bitumen, liquid coumarinindene resins, textile fibres, glass fibres, asbestos fibres, boron fibres, carbon fibres, cellulose, polyethylene powder, polypropylene powder, quartz flour, mineral silicates such as mica, asbestos flour, powdered slate, kaolin, aluminium trihydroxide, powdered chalk, gypsum, antimony trioxide, bentonite, silica aerogel (aerosil), lithopone, barytes, titanium dioxide, carbon black, graphite, oxide pigments such as iron oxide, or metal powders such as aluminium powder or iron powder.

Examples of organic solvents suitable for the modification of the curable mixtures are: toluene, xylene, n-propanol, butyl acetate, acetone, methyl ethyl ketone, diacetone alcohol, ethylene glycol monomethyl, monoethyl and monobutyl ether. Reactive diluents such as alkyl glycidyl ether, e.g. butyl glycidyl ether, can also be used.

Examples of plasticisers which can be used for the modification of the curable mixtures are: dibutyl, dioctyl and dinonyl phthalates, tricresyl phosphate, trixylene phosphate, diphenoxyethylformal and polypropylene glycols.

Examples of flow control agents which can be used in the curable mixtures, in particular for surface protection, are silicones, liquid acrylic resins, cellulose acetobutyrate, polyvinyl butyral, waxes, stearates etc. (some of which can also be used as mould release agents).

The preparation of the curable mixture of the invention is effected by mixing and homogenising in known mixing devices, e.g. agitators and impellers. If solid epoxy resins or hardeners are used it is advantageous to apply heat simultaneously in order to accelerate the mixing procedure.

The mixtures of this invention are used principally as casting and impregnating resins. Cured mouldings obtained therefrom have a greater dimensional stability under heat compared with unmodified resins, while having the same or improved mechanical properties. In addition they have good electrical properties, a longer pot life and often improved processing properties on account of the lowered viscosity.

The following Examples illustrate the invention in more detail.

EXAMPLE 1

Mixtures 1 to 3 and comparison mixture 4 are prepared at room temperature in vacuo by homogenising the components, and are then poured into moulds preheated to 140° C. in order to obtain mouldings. Precuring is effected for 12 hours at 90° C. and final curing for 18 hours at 140° C.

The properties of the mouldings are determined and the results are reported in Table 1.

Mixture 1

(a) 70 g of a liquid bisphenol A epoxy resin with an expoxide content of 5.1 to 5.5 eq./kg and a viscosity of 900–1300 mPas at 25° C.

(b) 130 g of a liquid mixture of phthalic anhydride, tetrahydrophthalic anhydride, tetrahydrophthalic acid and o-cresyl glycidyl ether.

(c) 1.5 g of a 1:1 mixture of tributylammonium phenolate and dibutyl phthalate as accelerator.

(d) 30 g of 1,3-diglycidyl-5-methyl-5-ethylhydantoin with an epoxide content of 8.771 eq./kg and a viscosity of 1100 mPas at 25° C.

Mixture 2

As mixture 1, except that (d) is 1,3-diglycidyl-5,5-dimethylhydantoin with an epoxide content of 7.84 eq./kg, m.p. 60°–70° C.

Mixture 3

As mixture 1, except that (d) is 2-glycidyloxy-1,3-bis-(1-glycidyl-5,5-dimethyl-2,4-imidazolidinedione)propane with an epoxide content of 6 eq./kg, viscosity 1200 mPas at 80° C.

Mixture 4 (comparison)

100 g of component (a) of mixture 1
100 g of component (b) of mixture 1
1.5 g of component (c) of mixture 1.

TABLE 1

| Property | Mixture | | | |
|---|---|---|---|---|
| | 1 | 2 | 3 | 4 |
| max. flexural strength, VSM (N/mm$^2$) | 166.1 | 160.6 | 157.4 | 155.6 |
| max. deflection at break VSM, (mm) | 7.4 | 7.5 | 7.8 | 6.6 |
| glass transition temperature (°C.)[1] | 113 | 120 | 114 | 105 |

[1]measured by differential thermoanalysis (DTA), with curing of the test mouldings for 15 hours at 140° C.

EXAMPLE 2

The curable mixtures listed in Table 2 are processed to test mouldings as in Example 1, the precuring being carried out for 12 hours at 90° C. and the final curing for 26 hours at 140° C. The processing and mechanical properties are also reported in Table 2.

As regards the processing properties, Table 2 shows that the pot life is improved and the viscosity lowered by the modification. As regards the mechanical properties, the dimensional stability under heat is improved, whilst the flexural strength and deflection at break remain virtually unchanged or are improved. The electrical properties are likewise improved.

TABLE 2

| liquid bisphenol A epoxy resin, epoxide content 5–5.5 eq./kg | (parts by weight) | 100 | 90 | 80 | 70 | 60 | 50 |
|---|---|---|---|---|---|---|---|
| 1,3-diglycidyl-5,5-dimethylhydantoin | (parts by weight) | 0 | 10 | 20 | 30 | 40 | 50 |

TABLE 2-continued

| | | | | | | | |
|---|---|---|---|---|---|---|---|
| hardener: isomerised methylhexa-hydrophthalic anhydride | (parts by weight) | 82 | 86 | 90 | 93 | 97 | 101 |
| boron trichloride/amine accelerator | (parts by weight) | 0.5 | 0.5 | 0.5 | 0.5 | 0.5 | 0.5 |
| Processing properties | | | | | | | |
| viscosity of impregnating mixture at 40° C. | (mPas) | 175 | 171 | 153 | 144 | 122 | 117 |
| pot life at 40° C. (doubling of initial viscosity) | (h) | 58 | 80 | 90 | 110 | 230 | 300 |
| gel time at 140° C. | (min) | 9.0 | 9.5 | 10.5 | 10.6 | 11.1 | 11.6 |
| latency time (pot life/gel time) | | 6.4 | 8.4 | 8.6 | 10.4 | 20.7 | 25.9 |
| Mechanical and electrical properties | | | | | | | |
| flexural strength (VSM) | (N/mm²) | 147 | 144 | 148 | 148 | 157 | 144 |
| deflection at break (VSM) | (mm) | 8.2 | 8.4 | 8.8 | 8.0 | 8.7 | 7.0 |
| dimensional stability under heat (DIN) | (°C.) | 126 | 128 | 133 | 134 | 139 | 146 |
| glass transition temperature after curing for 15 h/140° C. (DTA) | (°C.) | 144 | 151 | 152 | 157 | 160 | 163 |
| dissipation factor: 1% value at | (°C.) | 122 | 123 | 124 | 126 | 129 | 134 |
| water absorption after 4 days/RT (ISO) | (%) | 0.20 | 0.22 | 0.25 | 0.29 | 0.31 | 0.34 |
| tracking resistance | (stage) | KA 3c | KA 3c | KA 3c | KA 3c | KA 3c | KA 3c |
| arc resistance (ASTM D 495) | (sec) | 28 | 46 | 61 | 76 | 83 | 89 |

EXAMPLE 3

In the mixture of Example 2, 1,3-diglycidyl-5,5-dimethylhydantoin is replaced by 2-glycidyloxy-1,3-bis-(1-glycidyl-5,5-dimethyl-2,4-imidazolidinedione)propane (epoxide content 5.7–6.1 eq./kg, viscosity 5000–10,000 mPas at 80° C.). The results are reported in Table 3.

TABLE 3

| | | | | | |
|---|---|---|---|---|---|
| liquid bisphenol A epoxy resin (parts by weight) | 100 | 90 | 70 | 60 | 50 |
| hydantoin resin (parts by weight) | — | 10 | 30 | 40 | 50 |
| hardener (parts by weight) | 82 | 83 | 85 | 86 | 87 |
| accelerator (parts by weight) | 0.5 | 0.5 | 0.5 | 0.5 | 0.5 |
| Properties after curing | | | | | |
| max. flexural strength (VSM) (N/mm²) | 147 | 147 | 157 | 160 | 155 |
| max. deflection at break (VSM) (mm²) | 8.2 | 8.2 | 8.3 | 8.6 | 7.4 |
| dimensional stability under heat (°C.) MARTENS (DIN) | 126 | 129 | 136 | 146 | 141 |
| glass transition temperature (DTA) (°C.) | 144 | 150 | 161 | 165 | 167 |

EXAMPLE 4

Two casting resin mixtures are prepared, consisting of a bisphenol A epoxy resin (epoxide content 2.4–2.8 eq./kg), phthalic anhydride as hardener and an accelerator consisting of a mixture of 2-methylimidazoline and phthalic anhydride. The one mixture contains triglycidyl hydantoin of Example 3 as modifier, and the other does not contain a modifier. The solid bisphenol A epoxy resin is first liquified by heating (140° C.) and then stirred with the hydantoin resin until the mixture is homogenised. The powdered hardener is then added in portions at 120°–130° C. and well dispersed by stirring in vacuo (about 2 mbar) for 20–30 minutes. The hardener melts, and clear, homogeneous casting resin mixtures are obtained.

Composition of the Mixtures

| | modified mixture | non-modified mixture |
|---|---|---|
| bisphenol A epoxy resin | 60 parts by weight | 100 parts by weight |
| triglycidyl hydantoin | 40 parts by weight | — |
| hardener | 46 parts by weight | 30 parts by weight |
| accelerator | 1 part by weight | 1 part by weight |

Test mouldings are obtained by pouring the mixture into preheated moulds. After curing the mouldings for 9 hours at 120° C., the following properties are determined:

max. flexural strength (VSM)
max. deflection at break (VSM)
dimensional stability under heat (MARTENS, DIN).

The results are reported in Table 4.

TABLE 4

| Properties curing | Modified mixture | Non-modified mixture |
|---|---|---|
| Average max. flexural strength (N/mm²) | 185 | 150 |
| average max. deflection at break (mm) | 8.1 | 7.3 |
| dimensional stability under heat (MARTENS (°C.)) | 121 | 94 |

What is claimed is:

1. A flowable, curable mixture based on bisphenol epoxy resins containing on average more than one epoxy group in the molecule, a hardener for epoxy resins and, if desired, other ingredients, said mixture comprising
   (a) an anhydride hardener, and
   (b) a mixture of 90 to 50% by weight of at least one bisphenol epoxy resin and 10 to 50% by weight of at least one hydantoin epoxy resin of the formula I or II

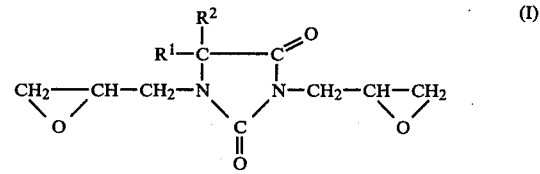

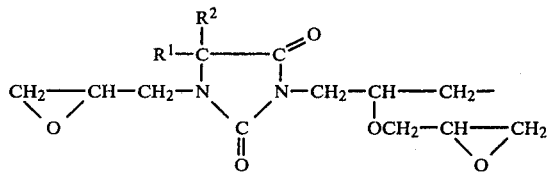
(II)

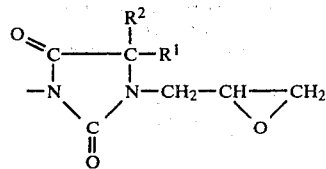

wherein $R^1$ and $R^2$ are methyl or ethyl.

2. A mixture according to claim 1 which contains 90 to 60% by weight of a bisphenol epoxy resin and 10 to 40% by weight of a hydantoin epoxy resin.

3. A mixture according to claim 1, wherein the bisphenol epoxy resin is derived from 2,2-bis-(4-hydroxyphenyl)propane.

4. A mixture according to claim 1 which contains the epoxy compound of formula II.

5. A mixture according to claim 1 which additionally contains a curing accelerator.

* * * * *